Aug. 30, 1932.   R. PURPLAW   1,874,207
PLANT BED
Filed Jan. 20, 1931
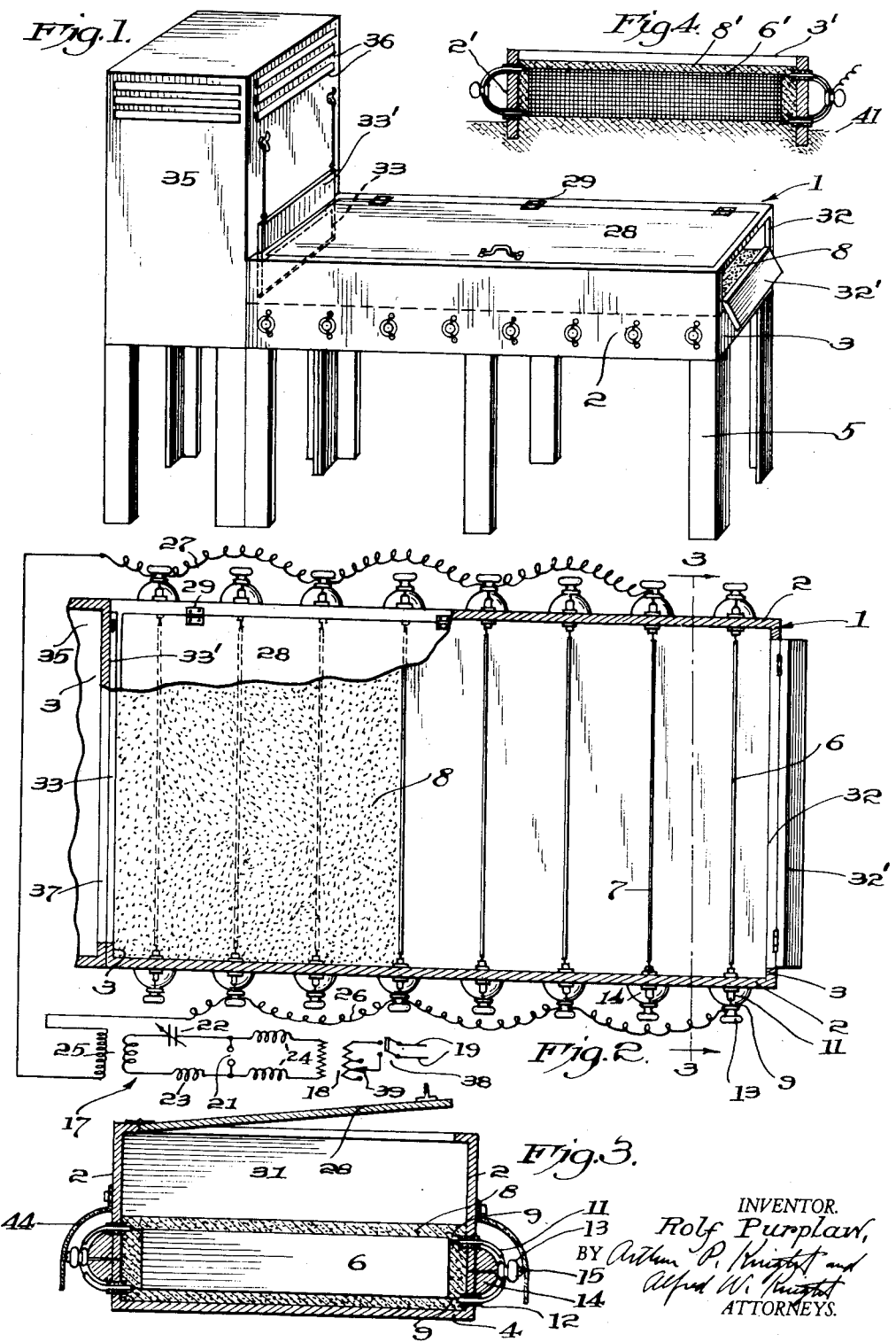

Patented Aug. 30, 1932

1,874,207

UNITED STATES PATENT OFFICE

ROLF PURPLAW, OF LOS ANGELES, CALIFORNIA

PLANT BED

Application filed January 20, 1931. Serial No. 509,953.

This invention relates to raising of plants from seeds, roots, bulbs, cuttings, or otherwise, and the principal object of the invention is to provide a bed for this purpose comprising a layer or body of suitable soil provided with advantageous means for increasing the temperature of the soil to the optimum temperature for promoting the growth of the particular plants to be raised. A particular object of the invention is to provide for heating the soil of the plant bed directly by passage of electric current therethrough, without danger of causing any injury to human beings in case of contact with the electrical apparatus or the supply circuit therefor. This object is accomplished according to this invention by employing electric current of high frequency and particularly of a frequency within a range which is substantially noninjurious to human beings at the voltages and currents to be used. Considerable variation is possible in the frequency of electric current to be used for this purpose, but I prefer to use an electric current whose frequency lies between 150 and 3500 kilocycles per second, as it has been found that electric currents both above and below this range are considerably more dangerous to human beings than those lying within this range. I have found that by the use of electric current of this type the soil within the plant bed may be effectively heated to the optimum temperature for plant growth without danger of causing more than possibly a slight skin burning to any human being who might accidentally touch or come in point contact with any part of the electric circuit.

A further object of the invention is to provide for heating of the soil within the plant bed to a substantially uniform temperature throughout the desired region occupied by the plants or the seeds, bulbs, cuttings or the like, from which such plants are to be grown.

Another object of the invention is to provide a plant bed apparatus having means which may be used if desired for cooling the air directly above the soil simultaneously with the heating of the soil itself, which may be advantageous in certain cases where it is desired to stimulate the growth of the roots or of that portion of the plant within the soil while holding back or retarding the development of that portion of the plant projecting from the soil.

The preferred form of apparatus according to my invention comprises essentially a bed of soil, opposing electrode means embedded within said soil, and high frequency electric power supply means connected to said opposing electrode means and adapted to maintain a sufficient potential difference between said electrode means to cause flow of current through the soil between the electrode means and thus heat such soil. The electrode means are supported and insulated in such manner that the passage of electric current therebetween can take place substantially solely through the intervening soil.

The accompanying drawing illustrates apparatus embodying my invention and referring thereto:

Fig. 1 is a perspective view of a preferred form of plant bed apparatus provided with heating means according to this invention and also with means for cooling the air directly above the plant bed.

Fig. 2 is a horizontal section of the plant bed but with a portion shown in plan view, and with the soil partly removed.

Fig. 3 is a transverse section on line 3—3 in Fig. 2.

Fig. 4 is a transverse section of a somewhat modified embodiment of the invention.

The apparatus shown in Figs. 1 to 3 inclusive comprises a box 1 formed of side members 2, end members 3 and bottom member 4, said members being ordinarily formed of wood although it will be understood that any suitable material may be used for this purpose. Due to the poor electrical conductivity of wood, the use of this material for constructing the box lessons the difficulty of insulating the electrodes and electrical conductors. Said box may be supported in any suitable position, but in order to mount the same at a convenient height above the ground I have shown it as mounted on supporting legs 5. A plurality of electrode members 6 and 7 of extended area are disposed alternately at intervals throughout the length of said box, and parallel to one another, said electrodes preferably extending vertically and throughout the major portion of the depth to be occupied by the soil within said box. I have shown the electrode members 6 and 7 as consisting of metal plates whose length is somewhat less than the width between the side walls 2 and whose height is somewhat less than the depth of the bed or layer of soil indicated at 8. The height of said electrodes, however, should be approximately equal to the depth of soil which it is desired to heat, such depth depending on the depth of the roots of the plants to be grown therein. The depth of the bed of soil should be sufficient to receive electrodes of the desired height without causing contact thereof with the bottom wall 4. The electrode plates are so supported as to be out of contact with and insulated from the walls of the box, and for this purpose I have shown conducting wires 9 provided with insulation 11 and connected to the four corners of each plate. Said wires extend through insulating sleeves 12 in the side walls 2 and are connected at their outer ends to insulating knobs or supports 13. Said insulating supports are shown as mounted on suitably shaped wooden blocks 14 and held in position by means of screws 15 extending through said wooden blocks and into the side walls 2.

After said electrode members are mounted in position and when it is desired to use the apparatus for growing plants, a layer or bed of soil 8 is placed within the box 1 to a sufficient depth to completely or substantially cover the electrode members and preferably to extend somewhat above the upper edges thereof, as shown in Fig. 3. Said soil may be of any suitable consistency and composition and may contain any suitable fertilizing agents or other constituents for promoting the growth of the plants.

The alternate electrode members 6 and 7 are electrically connected to the opposing terminals of a suitable source of high frequency electric current, adapted to produce electric current having a frequency within the range above stated, for example a frequency of 200 to 500 kilocycles per second. Said source of high frequency current is indicated in general at 17 and may be of any suitable type and construction. By way of example, such high frequency source is shown as comprising an input transformer 18 whose primary winding is connected by wires 19 to ordinary low frequency electric power supply means and whose secondary winding is connected to an oscillating circuit including spark gap 21, condenser or capacity means 22, inductance means 23 and choke coils 24 and also including the primary winding of high frequency transformer 25. One side of the secondary winding of said high frequency transformer is connected by wire 26 to the wires 9 connected to the electrode members 6 while the other side of said secondary winding is connected by a wire 27 to the wires 9 connected to the other electrode members 7. In order to provide for varying the frequency of the electric current, condenser 22 may be of variable capacity, as indicated. The connections to the supply circuit 19 may include switch 38 for opening and closing the circuit and switch 39 for connections to any one of a plurality of taps on the primary winding of transformer 18, so as to permit regulation of the high frequency current to any desired value. The spark gap 21 may also be adjustable if desired. The high frequency generating circuit may be mounted in any convenient postion, but is preferably located in a separate room or somewhat removed from the plant bed itself, in order to prevent injury to the plants by ozone or oxides of nitrogen produced by the spark discharge across spark gap 21. The circuit may also be provided with any suitable means, such as are commonly used, for preventing radiation of high frequency electrical energy therefrom and for preventing propagation of high frequency oscillations back into the power supply system 19, so as to eliminate radio interference.

If desired, the safety of the apparatus may be increased by providing strips of paper, rubber or other insulating material such as shown at 44 in Fig. 3, secured in any suitable manner to the outside of the side walls 2 and extending over the wires 26, 27, and 9, so as to prevent accidental bodily contact with said wires.

In order to provide for controlling the temperature of the air immediately above the soil of the plant bed, the side walls and end walls of the box 1 are shown as extended upwardly a suitable distance above the top of the soil, as indicated in Fig. 3 and a cover 28 is removably mountd on the upper ends of said walls, for example by means of hinges 29. An air space 31 is thus provided above the plant bed, which space may be separated from the surrounding atmosphere by closing the cover 28, or may be more or less completely opened to the surrounding atmosphere by opening said cover to a greater or less extent. The end walls are also preferably provided with openings 32 and 33 having movable closure means for controlling communication between the ends of this air space and the surrounding atmosphere, said closure means being shown as comprising a hinged door 32' for closing the opening 32 in one of the end walls and a vertically slidable door 33' for closing the opening 33 in the other end wall.

I also prefer to provide means for controlling the temperature of the air within the air space 31 and particularly for cooling the air within said space. Such means are shown as comprising a refrigerator 35 of any suitable type mounted at one end of the box 1 and provided with air admitting openings 36 adjacent its upper end and with an opening 37 adjacent its lower end registering with the opening 33 in the adjacent end wall of the box, so that when the closure members 32 and 33 are opened, cold air will be caused to flow from the refrigerator 35 through the air space 31. It will be understood that the cooling of the air within the refrigerator will induce a down draft through the inlet openings 36 in the upper portion thereof and out through the air space 31 which communicates with the lower portion of said refrigerator.

The above described plant bed may be used for growing plants from seed or from bulbs, roots, cuttings or in any other manner, the planting being carried out in the usual manner in the layer of soil indicated at 8 and between the electrode members 6 and 7, as stated above any suitable soil or combination of soils and other ingredients may be used. Good results may be obtained in certain cases by using a pure silica sand and supplying all the necessary chemicals for growth of the plants in solution in water applied to such sand before starting the growth or at intervals during the period of growth.

By turning on the electric current, the high frequency current generated in the oscillating circuit above described is transmitted through the wires 26 and 27 and through the several connecting wires 9 to the electrodes 6 and 7 and thence through the soil between said electrodes. In order that such soil may be sufficiently conductive to cause passage of a sufficient amount of current to effect the desired heating, there must always be a certain amount of moisture present therein, but the presence of such moisture would be required in any event in order to furnish the water required for the plants.

If desired, before introducing the seeds, bulbs or the like from which the plants are to be grown, the plant bed can first be pasteurized by raising the temperature to the pasteurizing point, for example about 150–160° F., and maintaining this temperature for a sufficient length of time to kill all or substantially all spores and bacteria therein, for example, for about three fourths of an hour. In certain cases, for example in the case of a very badly bacteria infected soil, the complete pasteurization is best insured by maintaining the plant bed at the optimum growing temperature of the spores and bacteria in the soil, for example about 98 to 100° F. for a period of several hours, or possibly several days before increasing the temperature to the pasteurizing point. After pasteurization is completed the current flow is reduced so as to lower the temperature to the optimum growing temperature for the plants and the electric current is thereafter controlled so as to maintain the plant bed at the desired temperature. Water may be applied to the plant bed at any suitable intervals during the growth of the plants in order to provide the water required for the plant growth and also to maintain the necessary conductivity in the soil. The electric current is preferably shut off during and shortly after the period during which the water is applied, in order to prevent the passage of an undue amount of current through the upper portion of the layer of soil.

Actual experiments which have been carried out have indicated that the growth of the plants may be very materially promoted by thus increasing the temperature of the soil in the plant bed. So long as the temperature does not exceed the optimum growing temperature there seems to be no limit on the amount of current flow permissible through the soil, and no injurious effects from the current flow have been observed. The benefits appear to be due mainly to the heating effect, although the electric current may also act to promote generation of ammonia and nitrogen compounds within the soil.

A particular advantage of the invention is that it promotes particularly the development of the roots or those parts of the plant below the surface of the soil, which renders it particularly well adapted for growing well rooted small plants for transplanting to the open field, and also the fast development of tubers and bulb plants such as carrots and radishes. Furthermore it gives an unsurpassed method for the rooting of plant cuttings and slips. In order to develop good roots on a cutting or slip it is necessary to force development within the portion thereof below the surface of the soil and to hold back the development of branches and leaves on the portion above the surface. By means of my apparatus this object can be easily accomplished since the temperature of the soil can be maintained at the optimum point as above described, while the air within the space 31 over the plant bed can be cooled down by operating the refrigerator 35 and opening the closure members 33' and 32' while leaving the cover 28 closed, so as to force the cool air from the lower portion of the refrigerator to pass out through this space.

This invention is of particular advantage in cold countries as well as in countries subject to sudden changes in temperature, such as the middle west of the North American continent. The flow of electric current may be easily turned on or off, or regulated, so as to maintain the soil at exactly the proper temperature regardless of the prevailing atmospheric temperature. Also, in case the atmospheric temperature becomes too high the refrigerating means may be operated without the heating means, so as to produce actual lowering of the temperature in the soil below that of the surroundings.

In arctic countries or other regions of prevailing cold temperatures for considerable periods of time, the use of this apparatus will improve living conditions by furnishing fresh vitamin-containing vegetables either during the cold winter months or during the summer, when there is enough sun light but not enough warmth naturally present in the soil for the raising of vegetables. The absence of danger to human beings also makes possible the installation of this apparatus in or adjoining living rooms in cold countries.

Other advantages of this invention are the low initial cost of maintenance, absence of wear due to lack of moving parts, small amount of attention required to insure steady operation, constant readiness for instantaneous use, and the fact that there is absolutely no expense incurred except during the time the apparatus is actually in operation either for heating or cooling or both.

In the embodiment of the invention shown in Fig. 4, the plant bed is shown as mounted directly on the ground instead of on a support above the ground. In this case I have shown the apparatus as provided with side walls 2' and end walls 3' confining a bed or body of soil indicated at 8', but it is not necessary to provide any bottom wall for the bed, the soil 8' resting directly on or constituting a part of the natural ground indicated at 41. With this exception the apparatus may be substantially the same as above described being provided as before with oppositely spaced electrode members, one of which is indicated at 6'. The electrode members are shown in this case, however, as consisting of screens, but it will be understood that the use of plates, screens, or other members of extended area is optional in any case. Said electrode members may be supported in the same manner as above described and connected as before to the two terminals of a suitable source of high frequency electric current. The operation of this form of apparatus is substantially the same as above described, and it will be understood that this form of the invention may also be provided, if desired, with suitable refrigerating means for effecting circulation of cold air over the air space directly above the plant bed.

I claim:

1. A hot bed comprising a bed of soil, a plurality of electrode members of extended area embedded within said soil and extending parallel to one another at equal intervals throughout substantially the length of said bed and extending transversely with respect to said length and across the major portion of the width of said bed, a source of high frequency electric current, means connecting alternate electrode members to one terminal of said source of current, and means connecting the remaining electrode members to the opposing terminal of said source of current.

2. A hot bed comprising a box, a bed of soil within said box, a plurality of electrode members embedded within said soil and disposed at substantially equal intervals throughout the length of said box and parallel to one another and extending transversely with respect to said length and across the major portion of the width of said box, and means connecting alternate sets of said electrode members to the respective terminals of a source of high frequency electric current so as to cause electric current to pass through the intervening soil.

3. A plant bed comprising a bed of soil, opposing electrode means embedded within said soil and spaced from one another, means for causing high frequency electric current to pass through the soil between said electrode means so as to heat the same, means enclosing an air space immediately above said bed of soil, and means for causing passage through said air space of air at a temperature lower than that of the surrounding atmosphere.

4. A plant bed comprising a box, a bed of soil within said box, the walls of said box extending above said bed of soil and serving to enclose an air space immediately above such soil, opposing electrode means embedded within said soil, means connecting said electrode means to the respective terminals of a source of high frequency electric current, refrigerating means, and means for drawing air from said refrigerating means through said air space.

5. A plant bed as set forth in claim 4 and comprising in addition means for controlling the passage of air from said refrigerating means through said air space.

In testimony whereof I have hereunto subscribed my name this 15th day of January, 1931.

ROLF PURPLAW.